United States Patent
Vos et al.

(10) Patent No.: US 10,271,302 B2
(45) Date of Patent: Apr. 23, 2019

(54) METHOD AND APPARATUS FOR PAGING TERMINALS IN A WIRELESS COMMUNICATION SYSTEM

(71) Applicant: Sierra Wireless, Inc., Richmond, British Columbia (CA)

(72) Inventors: Gustav Gerald Vos, Surrey (CA); Steven John Bennett, Coquitlam (CA)

(73) Assignee: Sierra Wireless, Inc., Richmond, British Columbia (CA)

( * ) Notice: Subject to any disclaimer, the term of this patent is extended or adjusted under 35 U.S.C. 154(b) by 0 days.

(21) Appl. No.: 15/343,945

(22) Filed: Nov. 4, 2016

(65) Prior Publication Data

US 2017/0135066 A1    May 11, 2017

Related U.S. Application Data

(60) Provisional application No. 62/251,508, filed on Nov. 5, 2015.

(51) Int. Cl.
| | |
|---|---|
| *H04W 68/00* | (2009.01) |
| *H04W 68/02* | (2009.01) |
| *H04W 72/04* | (2009.01) |
| *H04W 72/08* | (2009.01) |
| *H04L 1/00* | (2006.01) |
| *H04L 1/08* | (2006.01) |

(Continued)

(52) U.S. Cl.
CPC ........... *H04W 68/02* (2013.01); *H04L 1/0006* (2013.01); *H04L 1/0052* (2013.01); *H04L 1/08* (2013.01); *H04L 5/006* (2013.01); *H04L 5/0053* (2013.01); *H04W 72/042* (2013.01); *H04W 72/085* (2013.01); *H04J 11/00* (2013.01)

(58) Field of Classification Search
CPC . H04W 68/02; H04W 72/042; H04W 72/085; H04L 1/0006; H04L 1/0007; H04L 1/08; H04L 5/006
See application file for complete search history.

(56) References Cited

U.S. PATENT DOCUMENTS

| | | | |
|---|---|---|---|
| 8,149,949 B2 | 4/2012 | Miyoshi | |
| 8,953,477 B2 | 2/2015 | Lee et al. | |
| 2014/0256365 A1 | 9/2014 | Schmidt et al. | |

(Continued)

FOREIGN PATENT DOCUMENTS

WO    2017/075713    5/2017

OTHER PUBLICATIONS

"LTE The UMTS Long Term Evolution", 2nd Edition, Wiley, Aug. 29, 2011 Edited by Stefania Sesia; p. 62 and p. 84-86.

(Continued)

*Primary Examiner* — Moustapha Diaby
(74) *Attorney, Agent, or Firm* — McDonnell Boehnen Hulbert & Berghoff LLP

(57) ABSTRACT

A method and apparatus for paging terminals such as Low Cost User Equipment (UEs) in a wireless communication system such as the Long Term Evolution (LTE) system. Terminals determine their signal quality level and, based on the signal quality, determine a number of repetitions of a message to use for decoding of the message. The message corresponds to part of a procedure for paging the terminal. The terminal receives and combines the determined number of repetitions of the message in order to decode the message.

14 Claims, 3 Drawing Sheets

(51) Int. Cl.
*H04L 5/00* (2006.01)
*H04J 11/00* (2006.01)

(56) References Cited

U.S. PATENT DOCUMENTS

| | | | |
|---|---|---|---|
| 2015/0043445 A1* | 2/2015 | Xiong | H04L 5/14 370/329 |
| 2015/0131579 A1* | 5/2015 | Li | H04L 1/08 370/329 |
| 2015/0373683 A1* | 12/2015 | Schliwa-Bertling | H04W 4/70 370/329 |
| 2017/0064670 A1* | 3/2017 | Shen | H04W 68/005 |

OTHER PUBLICATIONS

International Search Report dated Jan. 11, 2017.
Written Opinion dated Jan. 11, 2017.

* cited by examiner

METHOD AND APPARATUS FOR PAGING TERMINALS IN A WIRELESS COMMUNICATION SYSTEM

CROSS-REFERENCE TO RELATED APPLICATIONS

This application claims the benefit and priority of U.S. Provisional Application 62/251,508, filed Nov. 5, 2015. The foregoing application is incorporated by reference herein in its entirety.

FIELD OF THE DISCLOSURE

The present technology pertains in general to wireless communications and in particular to paging terminals such as Low Cost User Equipment (UEs) in a wireless communication system such as the Long Term Evolution (LTE) system.

BACKGROUND

The Long Term Evolution (LTE) wireless communication standard can offer a high-capacity, high-speed wireless interface for use by mobile phones, data terminals, machine-type-communication (MTC) or machine-to-machine (M2M) equipment, and similar devices. However, in some instances it may be desirable to sacrifice aspects of an LTE terminal's performance (such as its data capacity) in order to gain other benefits, such as a reduced complexity and/or cost. The $3^{rd}$ Generation Partnership Project has considered such possibilities, for example in connection with "low-cost" or "limited capability" User Equipment (UE).

Release 13 of LTE proposed support for such a new Low Cost (LC) category of UE, sometimes referred to as "Category M". Category M UEs have performance objectives of lower cost, low power consumption and enhanced coverage. The enhanced coverage capability that is defined may also be made available to other categories of UE. UEs which are in a poor coverage area may need to operate in a coverage enhancement mode in which messages need to be repeated a relatively large number of times on average in order to provide sufficient connectivity. Such devices may be targeted toward use cases requiring small amounts of data communication at relatively infrequent times, and may be suitable for M2M applications.

There is a need to define ways for an eNB to be able to contact these new types of UEs by paging them. For enhanced coverage cases, multiple repetitions of paging messages may be used when required to contact a UE.

A current implementation for Category M UEs for Release 13 of the LTE standard requires a UE to receive a Paging Radio Network Temporary Identifier (P-RNTI) with a correct Cyclic Redundancy Check (CRC) code. This P-RNTI is transmitted in a particular Physical Downlink Control Channel, denoted the M-PDCCH, and the P-RNTI content is not unique to a UE. The timing of the Paging Occasion (PO) containing a P-RNTI is specific to a UE by a calculation that includes the UE's identification. In current LTE implementations, pages are sent to UEs at known times in a PO within a paging frame. The UEs and the network calculate the paging frame and paging occasion within the frame based on a mutually known calculation that depends on both the UE identity, its UE_ID, which is its International Mobile Subscriber Identity (IMSI) and the DRX cycle for that UE. Details of this mechanism and calculation are in "LTE The UMTS Long Term Evolution", 2nd Edition, Wiley, Edited by Stefania Sesia; p. 62 and p. 84-86. Extensions to the DRX time that can be configured to over 1 hour was proposed for release 13 of the LTE standard.

However, the above calculation can result in multiple UEs sharing a PO. Successful reception of P-RNTI corresponds to reception of a downlink grant that points to a Physical Downlink Shared Channel (PDSCH) where the actual page will be sent within the frequency band. In a proposed implementation of LTE Release 13, for UEs using coverage enhancement, the PDSCH containing the page is scheduled one or two subframes after the P-RNTI transmission or last repetition of the P-RNTI. The downlink grant indicates the timing. Only when the actual page is decoded will the UE be assured whether or not a page has been sent to it. The actual page will contain the IMSI of the targeted UE. The number of repetitions of the actual page can be the same as the number of P-RNTI repetitions.

If different numbers of possible repetitions of P-RNTI all ended at the same time, a UE attempting to receive them would potentially be required to combine all possible numbers of repetitions preceding that ending time. This would require extensive processing capability in order for all reception processes to complete in a sufficiently short time so as not to miss a potential paging message that could follow that P-RNTI. Thus one proposal is for the beginning of all possible combinations of repetitions of the P-RNTI to start at the same time, so that the endings will be at different times after that depending on the number of repetitions.

It is also possible that frequency hopping may be specified during P-RNTI repetition. Since Category M UEs can only receive 6 contiguous PRBs. The hopping would be to other blocks of 6 PRBs in systems containing sufficient bandwidth. This technique may reduce the required number of repetitions for a coverage level.

However, an unresolved issue is how an eNB can determine a level of coverage enhancement and therefore the number of repetitions that is needed to page a UE. Paging with too few repetitions results in a UE potentially failing to receive its page. Paging with too many repetitions represents a waste of communication resources. A further complication is that a UE may change its repetition needs, for example if the propagation environment changes and/or if the UE moves. In addition, the repetition level used by an eNB may not be known by a UE a priori, so the UE may be required to perform blind decoding on all possible repetition levels. Because repetition levels may be very long in the worst-case coverage scenarios, this represents a significantly time-consuming and power-consuming task for the UE. Because the algorithm used to determine which repetition level is used can be situational and implementation dependent, the UE may not be able to predict which repetition level will be used by the eNB, and hence the UE may have to assume the longest repetition level.

Therefore there is a need for a method and apparatus for paging terminals that is not subject to one or more limitations in the prior art.

This background information is provided for the purpose of making known information believed by the applicant to be of possible relevance to the present technology. No admission is necessarily intended, nor should be construed, that any of the preceding information constitutes prior art against the present technology.

SUMMARY

An object of the present technology is to provide a method and apparatus for paging terminals of a wireless communication system. In accordance with an aspect of the present disclosure, there is provided a method for paging terminals serviced by a wireless communication system, the method comprising: making a determination, by the terminal, of signal quality for signals received by the terminal from the wireless communication system; making a determination, by the terminal, of a number of repetitions of a message to use for decoding of the message, the determination of the number of repetitions made based on the determination of signal quality, the message corresponding to part of a procedure for paging the terminal; and receiving and combining the determined number of repetitions of the message in order to decode the message.

In accordance with another aspect of the present disclosure, there is provided a method for paging a terminal serviced by a wireless communication system, the method comprising: making a determination, by an eNB, of a number of repetitions of a message to transmit, the message corresponding to part of a procedure for paging a group of terminals including the terminal; including an indication of the number of repetitions within the message; and transmitting the determined number of repetitions of the message from the eNB for receipt by the group of terminals.

In accordance with another aspect of the present disclosure, there is provided a wireless terminal for communicative coupling to a wireless communication system, the wireless terminal comprising a processor and machine readable memory storing machine executable instructions. When executed by the processor, the machine readable instructions configure the wireless terminal to make a determination of signal quality for signals received by the terminal from the wireless communication system; make a determination of a number of repetitions of a message to use for decoding of the message, the determination of the number of repetitions made based on the determination of signal quality, the message corresponding to part of a procedure for paging the terminal; and receive and combine the determined number of repetitions of the message in order to decode the message.

In accordance with another aspect of the present disclosure, there is provided a wireless base station comprising a processor and machine readable memory storing machine executable instructions. When executed by the processor, the machine readable instructions configure the wireless base station to make a determination of a number of repetitions of a message to transmit, the message corresponding to part of a procedure for paging a group of terminals including the terminal; include an indication of the number of repetitions within the message; and transmit the determined number of repetitions of the message for receipt by the group of terminals.

In accordance with another aspect of the present disclosure, there is provided a system comprising a wireless base station and one or more wireless terminals configured as described above.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
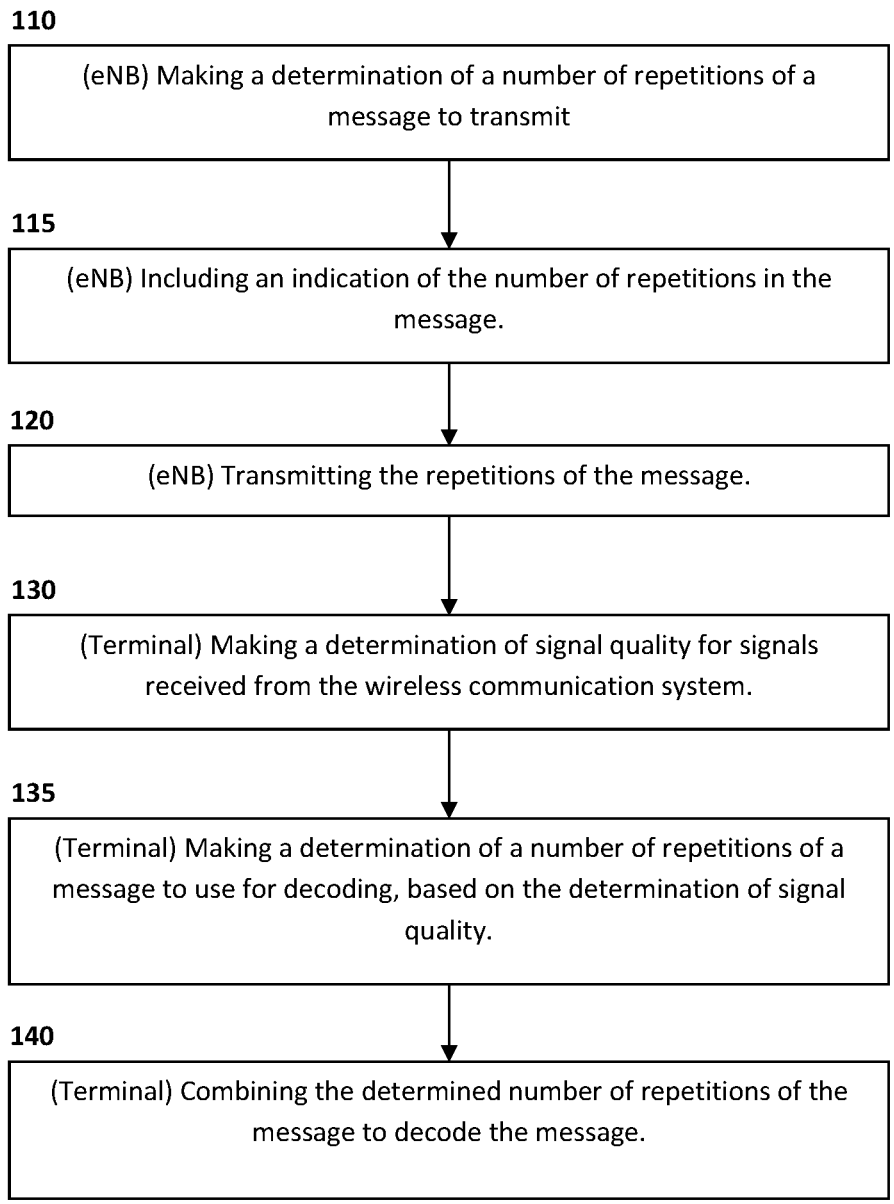
FIG. 1 illustrates a method for paging terminals in accordance with embodiments of the present disclosure.

Various technical terms specified herein may be understood with reference to standards documents pertaining to the Long Term Evolution (LTE) wireless communication, or similar wireless communication standards such as UMTS. While these terms should be read in a manner that is consistent with at least the LTE standard, it is understood that the technology as described herein may be adapted for use with certain other existing or future wireless communication standards or protocols.

Embodiments of the present disclosure relate to a method and apparatus for paging a UE, also referred to herein as a terminal, serviced by a wireless communication system. According to embodiments of the present disclosure, the terminal makes a determination of signal quality for radio signals received by the terminal from the wireless communication system, for example from an eNB thereof. The terminal then makes a determination of a maximum number of repetitions of a message that it will use to decode that message. The message can be transmitted by the eNB as part of a paging procedure, such as is described in the LTE standard as referenced above, and as will be described in more detail below. The determination of the maximum number of repetitions is made based on at least the determination of signal quality. The terminal then receives this number of repetitions of the message and uses them to perform blind decoding in order to recover the message.

The eNB may use a limited number of repetition levels for the message. Each repetition level corresponds to a predetermined number of repetitions of the message. For example, six repetition levels may be used, corresponding to 1, 3, 6, 20, 100, 180 repetitions of the message, respectively. The terminal may decode the message at a lower repetition level than was used by the eNB. Limiting the number of repetition levels may reduce the computational complexity and number of decoding options to consider at the terminal.

In embodiments of the present disclosure, the message being repeated by the eNB, and the repetitions thereof being combined by the terminal, is a Downlink Control Information (DCI) message containing a P-RNTI. The P-RNTI can be used by the terminal to receive the actual paging message in accordance with the LTE standard, as would be readily understood by a worker skilled in the art, and as referred to in the background section of this document.

For further reference, for Category M UEs and enhanced coverage UEs under Release 13 of the LTE Standard, the DCI is not in the legacy PDCCH that is at the beginning of a PRB. Rather, the DCI is located in the M-PDCCH. The M-PDCCH is located within the PDSCH that comes after the PDCCH in a PRB.

In accordance with embodiments of the present disclosure, the eNB is configured to make a determination of a number of repetitions of the message that are expected to be sufficient for adequate decoding by terminals to which the message is addressed. The eNB then transmits no more than this number of repetitions of the message. In embodiments, by limiting the number of repetitions transmitted, radio resource usage is limited and spectral efficiency is potentially improved. The message may be transmitted to a predetermined group of terminals, in accordance with the LTE standard.

In various scenarios, the eNB may be required to accommodate the repetition needs of a number of UEs with different requirements. Since, in Release 13 of the LTE Standard, the PO determination is made based on the DRX time and the UE's IMSI, the eNB may not be capable of grouping UEs of similar needs together. Rather, the eNB may be required to serve the group of UEs that are expecting a PO at a given instant.

FIG. 1 illustrates a method for paging a terminal serviced by a wireless communication system, in accordance with embodiments of the present disclosure. The method includes making a determination 110, by an eNB, of a number of repetitions of a message to transmit, the message corresponding to part of a procedure for paging a group of terminals including the terminal. The method further includes including 115, by the eNB, an indication of the number of repetitions within the message. The method further includes transmitting 120, by the eNB, the determined number of repetitions of the message from the eNB for receipt by the group of terminals. The method further includes making a determination 130, by the terminal, of signal quality for signals received by the terminal from the wireless communication system. The method further includes making a determination 135, by the terminal, of a number of repetitions of a message to use for decoding of the message, the determination of the number of repetitions made based on the determination of signal quality, the message corresponding to part of a procedure for paging the terminal. The method further includes receiving and combining 140 the determined number of repetitions of the message in order to decode the message. Additionally, the terminal may abort reception by terminating the receiving and combining operations even if nothing has been decoded yet. Aborting of reception is described further below.

Figure 2:
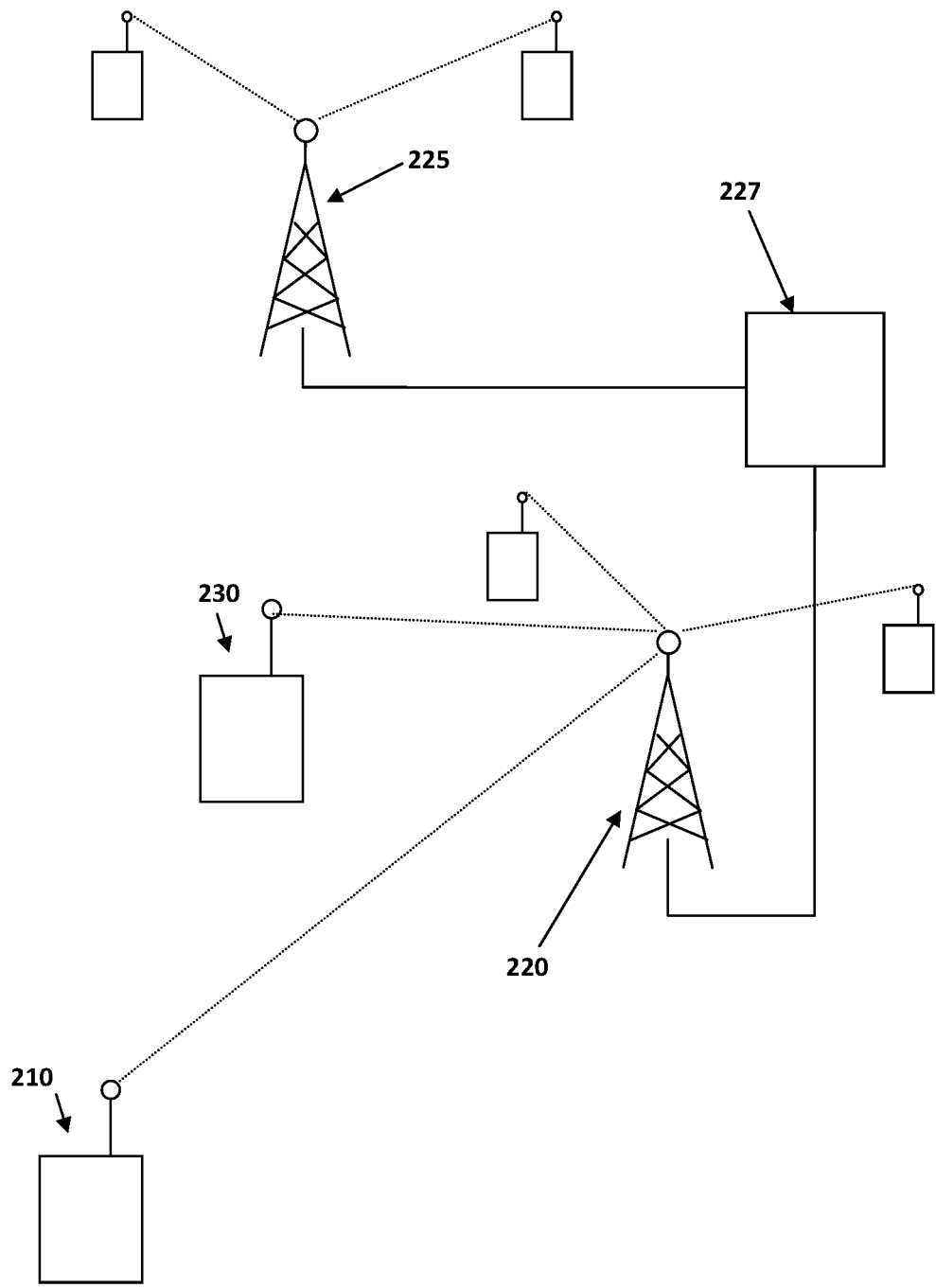
FIG. 2 illustrates a wireless communication system with respect to which embodiments of the present disclosure interact.

FIG. 2 illustrates a wireless communication system with which a wireless device 210 is configured to communicate via a network interface thereof. The wireless communication system may operate in accordance with a wireless communication protocol such as LTE, or other wireless communication protocol. As illustrated, the wireless communication system comprises a base station 220, or evolved Node B (eNB) or wireless access point, or nodeB or other similar device, communicatively coupled to the UE 210, and typically to a number of other UEs such as UE 230. The other UEs may be M2M/MTC or CAT M devices, for example. The wireless communication system may further comprise other base stations, eNBs, wireless access points, or other similar devices, such as base station 225, which may be communicatively coupled with other UEs. The base stations may be communicatively coupled with each other and with data networks, telephone networks, other wireless communication systems, via infrastructure equipment 227, such as equipment of a network backbone. Each base station and UE can include a standard set of components, for example in accordance with equipment compliant with the LTE standard or a similar standard. These components may be configured in order to operate as described herein.

In various embodiments, the eNB is configured to transmit a determined number of DCI repetitions containing a P-RNTI, the determined number being deemed sufficient for the terminal having the worst-case coverage among a group of terminals to be paged on a Paging Occasion (PO). Thus, the DCI repetitions containing the P-RNTI can correspond to the repeated message. For example, if the terminals to be paged are estimated to require between one and 10 DCI repetitions, the eNB may be configured to transmit the DCI message using the repetition level corresponding to a minimum number of repetitions greater than 10. In this way, it is expected that all terminals are potentially served on the first PO. More generally, the eNB may be configured to transmit the message using the repetition level corresponding to a minimum number of repetitions which is greater than the maximum number of messages deemed to be required by terminals in a given group in order to decode the message via combining.

In various embodiments, the group of UEs to be paged at a particular PO only has to include one UE that is estimated to need multiple repetitions of the message. The eNB then transmits the corresponding number of repetitions of the message. The UE in a group which has the worst coverage of the group thus drives what repetition level will be used. It is expected that this repetition level will be sufficiently large to facilitate reception by all other UEs of the group.

Further, the eNB may have to accommodate the repetition needs of a number of UEs with different requirements. Since, in LTE, the PO determination is based on the DRX time and each UE's IMSI, where the determination may result in multiple UEs having the same PO, the eNB cannot necessarily always group UEs of similar needs together, but rather must serve UEs based on which UEs are expecting a PO at a given time.

In various embodiments, a terminal having an adequate estimate of signal quality is configured to determine a maximum number of repetitions of the message that the terminal likely requires to decode the message. In some embodiments, this number of repetitions may be limited to one of the repetition levels, or the maximum number can be rounded up to the nearest value corresponding to one of the repetition levels. In embodiments, by limiting the number of messages that the terminal receives and combines, time and power consumption can be limited by the terminal.

Determinations of signal quality may be made in various ways. The signal quality may be represented, for example, as a signal-to-noise ratio or signal-to-interference-plus-noise ratio, where the signal corresponds to a signal transmitted by the eNB and received by the terminal. The signal quality may be estimated on the basis of pilot signals transmitted by the eNB, for example. Signal quality may alternatively be represented as an error rate, such as a bit error rate, a spectral efficiency, or other signal quality indicator, or a combination thereof.

In some embodiments, if no P-RNTI in DCI is received at a PO following the determined maximum number of repetitions, the terminal may be configured to abort further reception. For further clarity, and as noted above, the DCI message contains the P-RNTI, and repetitions of the DCI message are received and combined. Hence, the phrase "P-RNTI in DCI" can refer to the P-RNTI which is contained within the DCI message to be decoded via combining. The underlying rationale may be that the signal quality is high enough that if a P-RNTI in DCI had been transmitted by the eNB, then the terminal should have received it. Aborting reception may facilitate conservation of power by the terminal.

If the repetition level selected by a terminal matches the repetition level selected by the eNB, then all repetitions of the message transmitted by the eNB will be used by the terminal. If the repetition level selected by the terminal is lower than the repetition level selected by the eNB, then decoding of the message may be expedited, and the terminal may use less power since fewer than all copies of the message are used in the decoding. For example, the eNB may transmit 10 repetitions of the message and the terminal, being in very good coverage, may decode the message based on the first repetition only. The remaining repetitions may be unused or used by other terminals in a group to which the message is relevant.

As used herein, early decoding corresponds to a scenario in which the terminal uses fewer than all repetitions of the message as transmitted by the eNB. This may occur in scenarios where the signal quality as seen by the terminal is better than predicted by the eNB. For a P-RNTI in a DCI message indicative of a Paging message, the location of the Paging message may be relative to the last transmitted repetition of the message. In such scenarios, the message may include an indication of the number of repetitions of the message being transmitted. The indication can be the repetition level used by the eNB, for example. The terminal may use this information to infer the location (e.g. in time) of the last repetition, and use this information to determine the location of the Paging message, which may be fixed relative to the location of the last repetition.

In some embodiments, the number of subframes (e.g. 1 subframe or 2 subframes) included after the last repetition is also sent. The UE can determine the PO at which the repetitions begin by calculation based on known information including the IMSI of the UE (as described in the LTE standard). The UE is also informed, via content of the DCI as described above, of the number of repetitions of the message being transmitted. The UE is also informed, for example also via content of the DCI, of the 1 or 2 subframes after the decoding when the paging message will be sent. If the UE successfully decodes the DCI and P-RNTI, it can be configured to determine, from the above information, when to attempt reception of the paging message. If the UE decodes the DCI using fewer than all transmitted repetitions, the UE still possesses the above information and can thus determine when the paging message will be sent. If the time delay between determining when the paging message will be sent and the upcoming actual time of transmission of the paging message is sufficiently long, the UE can be configured to enter into a low power "sleep" until the actual transmission time.

In LTE, the Paging message may be transmitted on the Physical Downlink Shared Channel (PDSCH) a predetermined or indicated time interval after the last repetition. For example, the time interval can be indicated within the DCI. When the time interval can be selected from only two possibilities (e.g. either one subframe or two subframes), indicating the time interval being used requires only one bit of data in the DCI. As such, in the event of early decoding, the timing of the Paging message can be determined by the terminal and consequently received.

In various embodiments, the individual repetition levels and associated numbers of repetitions, potentially along with the PRB resources used in time and frequency for communicating the message, and the aggregation levels associated with the message, are standardized and made known a priori to eNBs and terminals. In embodiments, each successive repetition level includes the messages of lower repetition levels. As such, a terminal can try each combination in sequence starting with a single copy of the message and adding further repetitions of the message using known resources rather than having separate resources defined for each repetition level. As an alternative, this information may be communicated to terminals for example as system information.

In various embodiments, terminals are configured to use a conservative estimate of the number of repetitions of the message required for adequate decoding. That is, a terminal may be configured to obtain more repetitions than the minimum number of repetitions required to decode the message. Although this may result in more power being expended to decode the message, it increases the probability of decoding the message, for example in the event that the terminal has overestimated the signal quality. For example, this approach can improve the paging accuracy at the first Paging Occasion when the message is indicative of the upcoming location of a pending Paging message intended for the terminal.

Table 1 illustrates an example of a limited number of repetition levels provided, for example message repetitions based on enhanced coverage level, in accordance with an embodiment of the present disclosure. Each repetition level corresponds to a number of repetitions of a message, which may equal a number of Physical Resource Blocks (PRB)s, for example. Each repetition level may correspond to an "Enhanced Coverage" level with higher levels corresponding to terminals that require higher degrees of effort to communicate with the wireless network.

TABLE 1

| Enhanced Coverage | Repetitions (PRBs) |
|---|---|
| −10 dB | 1 |
| −5 dB | 3 |
| 0 dB | 6 |
| 5 dB | 20 |
| 10 dB | 100 |
| 15 dB | 180 |

For example, with reference to Table 1, when 180 message repetitions are present, and each PRB can include a DCI with P-RNTI, then the 180 messages can be provided via six different frequencies, each frequency including 30 subframes in time.

Figure 3:
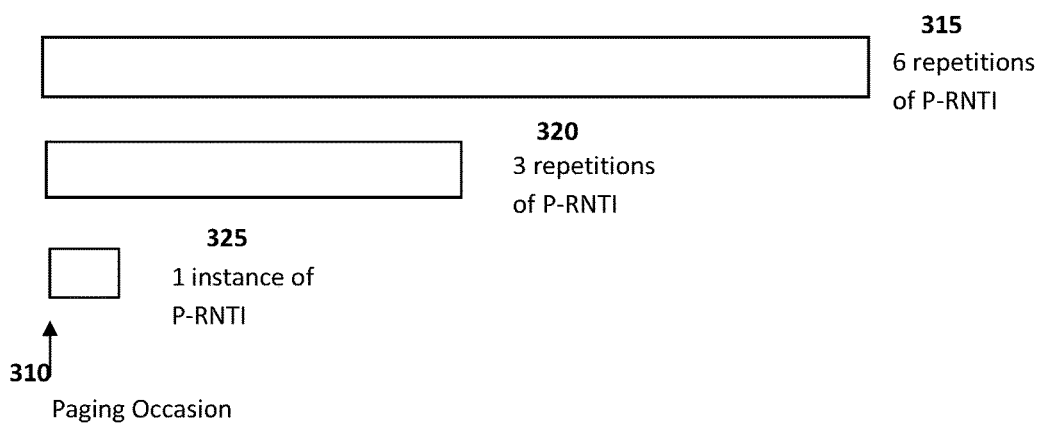
FIG. 3 illustrates message repetition in accordance with an embodiment of the present disclosure.

FIG. 3 illustrates message repetition in accordance with an embodiment of the present disclosure. A Paging Occasion (PO) is defined for a terminal which has a common start time 310 for multiple potential repetition levels. Repetitions of the page follow the start of the PO. Repetition levels 315, 320, 325 corresponding respectively to six, three and one repetition of the P-RNTI (message) are illustrated. A terminal can attempt blind decoding on the individual page, as well as on combinations of pages.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each step of the method may be executed on any computing device, such as a personal computer, mobile or handheld wireless device, M2M device, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

Embodiments of the present disclosure can include a UE, eNB, or other relevant communication equipment, or component thereof, configured to operate as described herein to implement UE paging. Embodiments of the present disclosure include data processing, signal processing operations and/or communication operations which have been described herein. Various embodiments of the present disclosure include computing hardware configured to perform such operations. Examples of such computing hardware include, but are not necessarily limited to, a microprocessor configured to execute program instructions store in a memory, a digital signal processing circuit, a microcontroller, an application specific integrated circuit, a collection of digital and/or analog electronic components, or the like, or a combination thereof.

Some embodiments of the present disclosure provide for a processing component of a UE, such as a Digital Signal Processor (DSP). The processing component is coupled to a radio transceiver for receiving radio signals therefrom and providing radio signals thereto. The processing component is configured to receive, from the radio transceiver, signal information (such as pilot sequences) and to make a determination of signal quality based thereon. The processing component is further configured to determine a number of repetitions of a message to receive and decode, and to operate in association with the transceiver to receive and decode the message, and to perform further actions based on content of the message. Various appropriate digital signal processor hardware which can be adapted to perform the processing operations as described herein would be readily understood by a worker skilled in the art.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

The invention claimed is:

1. A method for paging a terminal serviced by a wireless communication system, the method comprising:
    making a determination, by the terminal, of signal quality for signals received by the terminal from the wireless communication system;
    making a determination, by the terminal, of a number of repetitions of a message to use for decoding the message, the determination of the number of repetitions made based on the determination of signal quality, the message corresponding to part of a procedure for paging the terminal;
    receiving and combining the determined number of repetitions of the message in order to decode the message, wherein the determined number of repetitions is lower than a repetition level selected by an evolved NodeB (eNB); and
    determining, by the terminal, timing for receiving a paging message from the decoded message.

2. The method according to claim 1, wherein more than the determined number of repetitions of the message are received and combined to decode the message.

3. The method according to claim 1, wherein the message is a Downlink Control Information (DCI) message containing a Paging Radio Network Temporary Identifier (P-RNTI).

4. The method according to claim 3, wherein the DCI includes an indication of a number of repetitions being transmitted by the eNB.

5. A method for paging a terminal serviced by a wireless communication system, the method comprising:
    making a determination, by an evolved NodeB (eNB), of a number of repetitions of a message to transmit, the message corresponding to part of a procedure for paging a group of terminals including the terminal, wherein the number of repetitions is sufficient for a terminal having a worst case coverage to decode the message, the terminal having the worst case coverage belonging to the group of terminals;
    including an indication of the number of repetitions within the message;
    including an indication of timing of transmission of a paging message within the message; and
    transmitting the determined number of repetitions of the message and the indication of timing of transmission of the paging message from the eNB for receipt by the group of terminals.

6. The method according to claim 5, wherein a limited number of repetition levels is used to define the number of repetitions of the message, wherein each repetition level defines a predetermined number of repetitions.

7. The method according to claim 5, wherein the message is a Downlink Control Information (DCI) message containing a Paging Radio Network Temporary Identifier (P-RNTI).

8. The method according to claim 7, wherein the P-RNTI is indicative of a paging message and a location of the paging message is relative to a last transmitted repetition of the message.

9. A wireless terminal for communicative coupling to a wireless communication system, the wireless terminal comprising:
    a processor; and
    machine readable memory storing machine executable instructions which when executed by the processor configure the wireless terminal to:
    make a determination of signal quality for signals received by the wireless terminal from the wireless communication system;
    make a determination of a number of repetitions of a message to use for decoding the message, the determination of the number of repetitions made based on the determination of signal quality, the message corresponding to part of a procedure for paging the wireless terminal;
    receive and combine the determined number of repetitions of the message in order to decode the message, wherein the determined number of repetitions is lower than a repetition level selected by an evolved NodeB (eNB); and
    determine timing for receiving a paging message from the decoded message.

10. The wireless terminal according to claim 9, wherein the machine executable instructions which when executed by the processor configure the wireless terminal to receive and combine more than the determined number of repetitions of the message to decode the message.

11. A wireless base station for paging a terminal serviced by a wireless communication system, the wireless base station comprising:
    a processor; and machine readable memory storing machine executable instructions which when executed by the processor configure the wireless base station to:

make a determination of a number of repetitions of a message to transmit, the message corresponding to part of a procedure for paging a group of terminals including the terminal, wherein the number of repetitions is sufficient for a terminal having a worst case coverage to decode the message, the terminal having the worst case coverage belonging to the group of terminals;

include an indication of the number of repetitions within the message;

include an indication of timing of transmission of a paging message within the message; and transmit the determined number of repetitions of the message and the indication of timing of transmission of the paging message for receipt by the group of terminals.

12. The wireless base station according to claim 11, wherein the message is a Downlink Control Information (DCI) message containing a Paging Radio Network Temporary Identifier (P-RNTI).

13. The wireless base station according to claim 12, wherein the P-RNTI is indicative of a paging message and a location of the paging message is relative to a last transmitted repetition of the message.

14. The wireless base station according to claim 11, wherein a limited number of repetition levels is used to define the number of repetitions of the message, wherein each repetition level defines a predetermined number of repetitions.

* * * * *